(12) United States Patent
Cebe et al.

(10) Patent No.: US 10,848,481 B1
(45) Date of Patent: Nov. 24, 2020

(54) SYSTEMS AND METHODS FOR REVOCATION MANAGEMENT IN AN AMI NETWORK

(71) Applicants: Mumin Cebe, Miami, FL (US); Kemal Akkaya, Miami, FL (US)

(72) Inventors: Mumin Cebe, Miami, FL (US); Kemal Akkaya, Miami, FL (US)

(73) Assignee: The Florida International University Board of Trustees, Miami, FL (US)

( * ) Notice: Subject to any disclaimer, the term of this patent is extended or adjusted under 35 U.S.C. 154(b) by 0 days.

(21) Appl. No.: 16/875,050

(22) Filed: May 15, 2020

Related U.S. Application Data

(60) Provisional application No. 62/849,510, filed on May 17, 2019.

(51) Int. Cl.
*H04L 29/06* (2006.01)
*G06F 21/00* (2013.01)

(52) U.S. Cl.
CPC .......... *H04L 63/0823* (2013.01); *G06F 21/00* (2013.01); *H04L 63/08* (2013.01); *H04L 63/20* (2013.01)

(58) Field of Classification Search
CPC ..... H04L 63/0823; H04L 63/20; H04L 63/08; G06F 21/00
USPC ............................................................ 726/1
See application file for complete search history.

(56) References Cited

U.S. PATENT DOCUMENTS

| | | | | |
|---|---|---|---|---|
| 6,760,416 B1 * | 7/2004 | Banks | ................. | H04L 29/1216 379/106.08 |
| 8,863,228 B2 * | 10/2014 | Nishibayashi | ...... | H04L 63/0435 726/1 |
| 8,893,227 B2 * | 11/2014 | Lu | ....................... | H04L 63/0853 726/2 |
| 9,049,185 B1 * | 6/2015 | Papadopoulos | ....... | G06F 16/951 |
| 9,106,631 B2 * | 8/2015 | Hester | ................. | H04L 12/2834 |
| 9,215,075 B1 * | 12/2015 | Poltorak | ................ | H04L 9/006 |
| 9,246,895 B2 * | 1/2016 | Tan | ................... | H02J 13/00028 |
| 2003/0177352 A1 * | 9/2003 | Camenisch | ........... | H04L 9/3255 713/158 |
| 2006/0137006 A1 * | 6/2006 | Ramzan | .................. | G06F 21/33 726/21 |
| 2012/0137126 A1 * | 5/2012 | Matsuoka | ............. | H04L 9/0897 713/156 |

(Continued)

FOREIGN PATENT DOCUMENTS

| | | | | |
|---|---|---|---|---|
| JP | 2016039562 A | * | 3/2016 | |
| KR | 20140154707 A | * | 5/2016 | |
| WO | WO-2012059794 A1 | * | 5/2012 | ........... H04L 9/3268 |

OTHER PUBLICATIONS

Jan Camenisch et al., Dynamic Accumulators and Application to Efficient Revocation of anonymous Credentials, in Crypto, vol. 2442, Springer, 2002, 15 pages.

*Primary Examiner* — Shahriar Zarrineh

(74) *Attorney, Agent, or Firm* — Saliwanchik, Lloyd & Eisenschenk

(57) ABSTRACT

Systems and methods for certificate revocation management for advanced metering infrastructure networks are provided. An accumulation manager can be used to accumulate certificate revocation list (CRL) information and determine an accumulator value and a proof value based on the accumulated CRL information using a plurality of functions. These values can be sent on to smart meters, which can then use them for authentication purposes.

16 Claims, 8 Drawing Sheets

(56) References Cited

U.S. PATENT DOCUMENTS

| | | | |
|---|---|---|---|
| 2012/0144459 A1* | 6/2012 | Nguyen | H04L 9/0891 |
| | | | 726/5 |
| 2012/0173873 A1* | 7/2012 | Bell | G06F 21/572 |
| | | | 713/156 |
| 2012/0266209 A1* | 10/2012 | Gooding | H04L 63/20 |
| | | | 726/1 |
| 2012/0328101 A1* | 12/2012 | Lakshminarayanan | |
| | | | H04L 63/107 |
| | | | 380/258 |
| 2013/0154850 A1* | 6/2013 | Chan | G01D 4/002 |
| | | | 340/870.02 |
| 2013/0232554 A1* | 9/2013 | Campagna | H04L 9/0847 |
| | | | 726/4 |
| 2013/0232556 A1* | 9/2013 | Tan | G06F 21/33 |
| | | | 726/4 |
| 2014/0176340 A1* | 6/2014 | Liang | H04W 12/02 |
| | | | 340/870.02 |
| 2014/0281525 A1* | 9/2014 | Acar | H04L 9/3213 |
| | | | 713/168 |
| 2015/0013001 A1* | 1/2015 | Lee | H04L 63/0823 |
| | | | 726/15 |
| 2015/0324589 A1* | 11/2015 | Thanos | G06F 21/60 |
| | | | 726/1 |
| 2016/0105423 A1* | 4/2016 | Logue | H04L 9/3268 |
| | | | 726/10 |
| 2016/0373418 A1* | 12/2016 | Stahl | H04L 9/0838 |
| 2016/0380776 A1* | 12/2016 | Thubert | H04L 9/3263 |
| | | | 713/175 |
| 2017/0126647 A1* | 5/2017 | Zhang | H04L 63/126 |
| 2018/0131525 A1* | 5/2018 | Kass | H04L 67/2804 |
| 2019/0190961 A1* | 6/2019 | McGrew | H04L 63/1425 |
| 2020/0036701 A1* | 1/2020 | Mathew | H04L 41/16 |

\* cited by examiner

10,848,481 B1

SYSTEMS AND METHODS FOR REVOCATION MANAGEMENT IN AN AMI NETWORK

CROSS-REFERENCE TO A RELATED APPLICATION

This application claims the benefit of U.S. Provisional Application Ser. No. 62/849,510, filed May 17, 2019, which is hereby incorporated by reference herein in its entirety, including any figures, tables, and drawings.

GOVERNMENT SUPPORT

This invention was made with government support under Grant Number DE-OE0000779 awarded by Department of Energy. The government has certain rights in the invention.

BACKGROUND

The existing power grid is currently going through a major transformation to enhance its reliability, resiliency, and efficiency by enabling networks of intelligent electronic devices, distributed generators, and dispersed loads, which is referred to as Smart(er) Grid. Advanced metering infrastructure (AMI) networks are one of the renewed components of Smart Grids that help to collect smart meter data using two-way communication. Smart meters are typically connected via a wireless mesh network with a gateway (or access point) serving as a relay between the meters and the utility company. The security requirements for the AMI network are similar to those of conventional networks, including confidentiality, authentication, message integrity, access control, and non-repudiation, all of which are important to secure the AMI. Confidentiality is needed to prevent exposure of customers' private data to unauthorized parties while integrity is needed to ensure that power readings are not changed for billing fraud. Authentication is crucial to prevent any compromised smart meters from communicating with other smart meters.

As with conventional networks, these requirements can be met by using either symmetric or asymmetric key cryptography. However, in both cases management of the keys is a major issue in terms of automation, efficiency, and cost. Due to the huge overhead of maintaining symmetric keys, using public keys can provide some advantages and make it easier to communicate with internet protocol (IP)-based outside networks when needed. Moreover, according to the National Institute of Standards and Technology (NIST), public key infrastructure (PKI) is more appropriate for large AMI depending on the number of possible communicating pairs of devices. As an example, companies such as Landis&Gyr and Silver Spring Networks use PKI to provide security for millions of smart meters in the United States. In such a PKI, the public keys for smart meters and utilities are stored in certificates that are issued by Certificate Authorities (CAs).

There are multiple purposes for employing PKI with the help of certificates in AMI applications. For instance, some AMI applications such as demand-response require mutual authentication while regular data collection necessitates authentication among smart meters if multi-hop transmission is in place. Code-signing certificates are needed for firmware management of smart meters. The employment of certificates in all of these cases requires management of the certificates, which includes creation, renewal, distribution, and revocation. In particular, certificate revocation and its association with smart meters are critical and have the potential to impact the performance of AMI applications significantly.

BRIEF SUMMARY

Embodiments of the subject invention provide novel and advantageous systems and methods for revocation management (e.g., certificate revocation management) for an advanced metering infrastructure (AMI) network. An accumulation manager can be used to accumulate certificate revocation list (CRL) information and determine an accumulator value and a proof value based on the accumulated CRL information using a plurality of functions. These values can be sent on to smart meters, which can then use them for authentication purposes. Because the authentication values are stored locally in the smart meters and because the authentication values are only two integers, authentication can be performed much more quickly and with limited computational overhead.

In an embodiment, a system for revocation management for an AMI network can comprise: a plurality of smart meters; a head-end system (HES) configured to collect power data from the plurality of smart meters; a gateway in operable communication with the plurality of smart meters and the head-end system; a CRL collector configured to collect CRLs from certificate authorities (CAs); an accumulation manager in operable communication with the CRL collector and configured to receive CRL information from the CRL collector, the CRL information being based on the collected CRLs; and a head-end management server (HMS) in operable communication with the accumulation manager and the HES. The accumulation manager can be further configured to accumulate the CRL information and determine an accumulator value (A or $A^r$) and a proof value ($nr_{proof}$ or $nr_{proof}^r$) based on the accumulated CRL information using a plurality of functions. The HMS can be configured to receive the accumulator value and the proof value from the accumulation manager and send the accumulator value and the proof value to the HES for distribution to the plurality of smart meters. The accumulator value and the proof value can be used by the plurality of smart meters to verify that communication (e.g., from another smart meter) should be accepted. The accumulation manager can be, for example, a Rivest-Shamir-Adleman (RSA) accumulator. The CRLs collected from the CAs can comprise serial numbers of revoked certificates and optionally corresponding revocation dates of the revoked certificates. The accumulation manager can be configured to send signals only to the HMS and not to any other device, and/or the CRL collector can be configured to send signals only to the accumulation manager and not to any other device. The HES can be configured to communicate with the plurality of smart meters via the gateway by first communicating with the gateway over a wireless network (e.g., a long term evolution (LTE) network). The CRLs can comprise full CRLs, delta CRLs that include only changes from a previous CRL, or both. The plurality of functions can comprise a Setup( ) function, a ComputeAcc( ) function, a ComputeNonRevokedProof( ) function, an UpdateAcc( ) function, and an UpdateNonRevokedProof( ) function. The determining of the accumulation value and the proof value can comprise using a prime representative for each certificate serial number in the CRL information as inputs for the plurality of functions. The determining of the accumulation value can comprise using Equation 2 disclosed herein. The determining of the proof value can comprise using an initial proof value created by a utility company and updating the initial proof value based on a set of revoked certificates and the accumulation value.

In another embodiment, a method for revocation management for an AMI network can comprise: collecting, by a CRL collector, CRLs from CAs; sending, by the CRL collector, CRL information to an accumulation manager, the CRL information being based on the collected CRLs; accumulating, by the accumulation manager the CRL information; determining, by the accumulation manager, an accumulator value (A or A$^t$) and a proof value ($nr_{proof}$ or $nr_{proof}^t$) based on the accumulated CRL information using a plurality of functions; sending, by the accumulation manager, the accumulator value and the proof value to an HMS; sending, by the HMS, the accumulator value and the proof value to an HES; distributing, by the HES, the accumulator value and the proof value to a plurality of smart meters; and using, by the plurality of smart meters, the accumulator value and the proof value to verify that communication (e.g., from another smart meter) should be accepted. The accumulation manager can be, for example, an RSA accumulator. The CRLs collected from the CAs can comprise serial numbers of revoked certificates and optionally corresponding revocation dates of the revoked certificates. The accumulation manager can be configured to send signals only to the HMS and not to any other device, and/or the CRL collector can be configured to send signals only to the accumulation manager and not to any other device. The HES can be configured to communicate with the plurality of smart meters via the gateway by first communicating with the gateway over a wireless network (e.g., an LTE network). The CRLs can comprise full CRLs, delta CRLs that include only changes from a previous CRL, or both. The plurality of functions can comprise a Setup( ) function, a ComputeAcc( ) function, a ComputeNonRevokedProof( ) function, an UpdateAcc( ) function, and an UpdateNonRevokedProof( ) function. The determining of the accumulation value and the proof value can comprise using a prime representative for each certificate serial number in the CRL information as inputs for the plurality of functions. The determining of the accumulation value can comprise using Equation 2 disclosed herein. The determining of the proof value can comprise using an initial proof value created by a utility company and updating the initial proof value based on a set of revoked certificates and the accumulation value.

DETAILED DESCRIPTION

Figure 1:
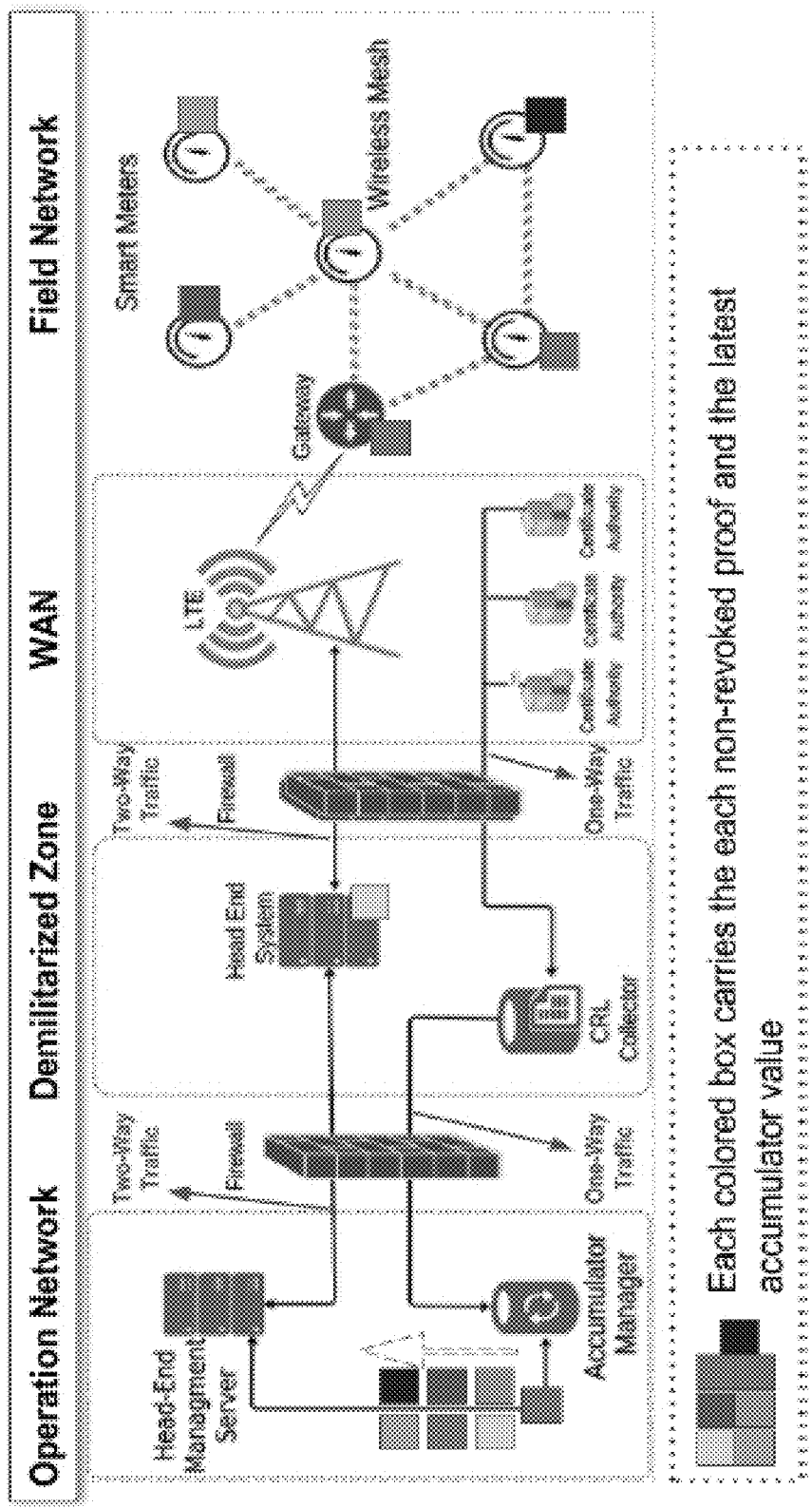
FIG. 1 shows a schematic view of a revocation management system, according to an embodiment of the subject invention.

Embodiments of the subject invention provide novel and advantageous systems and methods for revocation management (e.g., certificate revocation management) for an advanced metering infrastructure (AMI) network. An accumulation manager can be used to accumulate certificate revocation list (CRL) information and determine an accumulator value and a proof value based on the accumulated CRL information using a plurality of functions. These values can be sent on to smart meters, which can then use them for authentication purposes. Because the authentication values are stored locally in the smart meters and because the authentication values are only two integers, authentication can be performed much more quickly and with limited computational overhead.

There are several reasons for revoking certificates, including but not limited to key compromise, certificate compromise, excluding malicious meters, and renewing devices. As a result, when processing certificates, a certificate's revocation status must be checked before it is accepted. A certificate revocation list (CRL) is a commonly used method for certificate revocation schemes that keeps a list of serial numbers and revocation dates for revoked certificates. The status of a certificate can be determined by checking whether it is in the CRL or not. Considering the large number of smart meters in an AMI and the fact that the expiration period of a certificate can be very long (and even lifelong in particular applications) compared to other types of networks and systems (e.g., websites), the CRL size will grow significantly as time passes. In addition, there are several known incidents that suddenly cause revocation of a large number of certificates. For instance, a chip deficiency on Rivest-Shamir-Adleman (RSA) key generation can cause revocation of huge number of certificates that deploy a specific chip, and heartbleed vulnerability has been known to cause the revocation of millions of certificates immediately. Thus, independent of the aforementioned predetermined revocation reasons, if there is a new vulnerability in the used algorithms for certificates, a huge number of revocations may additionally occur. Dealing with the overhead of CRLs can therefore become a burden both for the resource-constrained smart meters in terms of storage and for the AMI infrastructure, which is typically restricted in terms of bandwidth to distribute these CRLs. The latter is particularly critical because reliability and efficiency of AMI data communication is crucial in the functioning of the distribution systems in a power grid.

Solutions such as online certificate status protocol (OCSP) cannot be applied because they are geared for internet communications to access a remote server each time there is a revocation check request. As AMI infrastructures are not suitable for such solutions in terms of remote access and bandwidth capacity, there is a need to develop a lightweight solution to manage the revocation information without causing too much overhead to the AMI.

Embodiments of the subject invention provide communication-efficient revocation systems and schemes for AMI networks by using RSA accumulators. An RSA accumulator is a cryptographic tool that is able to represent a set of values with a single accumulator value (i.e., digest a set into a single value) (see also Camenisch et al., "Dynamic accumulators and application to efficient revocation of anonymous credentials," in Crypto, vol. 2442. Springer, 2002, pp.

61-76; which is hereby incorporated by reference herein in its entirety). Moreover, it provides a mechanism to check whether an element is in the set or not, which implicitly means that cryptographic accumulators can be used for efficient membership testing. RSA accumulators are advantageous due to their size, and they can be adapted by introducing several novel elements. Specifically, an accumulator manager within the utility company (UC) can be tasked with collection of CRLs from CAs and accumulating these CRLs (i.e., revoked certificates' serial numbers) to a single accumulator value that can then be distributed to the smart meters. Along with the accumulator value, a customized non-revoked proof can also be introduced and distributed to allow/enable a smart meter to check whether another meter's certificate is revoked without a need to refer to the CRL file.

Testing via simulations in an ns3 network and via an actual testbed at Florida International University (FIU) in Miami, Fla., USA using in-house smart meters to assess performance realistically shows that the embodiments of the subject invention significantly outperform related art systems and methods in terms of reducing the communication overhead that is measured with the completion time. The overhead in terms of computation is not as significant and can be handled in advance within the utility that will not impact the smart meters.

Due to increasing interest in Smart Grid, there have been several efforts to study PKI for Smart Grid communication infrastructure. Some methods use Bloom Filters, but these suffer from false positives and may eventually require accessing the actual server to check the validity of a certificate. Other methods suffer from additional inter-meter communication overhead for accessing CRL information. Still other methods use cryptographic accumulators but accumulation of certificates of valid smart meters to provide a revocation mechanism constitutes a significant overhead due to the fact that revocation frequency is less than that of creating new certificates and the quantity of revoked certificates is also less than the quantity of valid certificates. Embodiments of the subject invention overcome all of these limitations by not requiring any access of a remote server, not having additional inter-meter communication overhead for accessing CRL information, and avoiding excessive accumulation of certificates.

The cryptographic accumulator concept is a one-way hash function with a special property of being quasi-commutative (see also Benaloh et al., "One-way accumulators: A decentralized alternative to digital signatures," in Workshop on the Theory and Application of Cryptographic Techniques. Springer, 1993; which is hereby incorporated by reference herein in its entirety). A quasi-commutative function is a special function F such that $y_0, y_1, y_2 \in Y$:

$$\mathcal{F}(\mathcal{F}(y_0,y_1),y_2) = \mathcal{F}(\mathcal{F}(y_0,y_2),y_1) \quad (1)$$

The properties of this function can be summarized as follows: 1) it is a one-way function, i.e., hard to invert; 2) it is a hash function for obtaining a secure digest A (i.e., accumulator value) where $A=F(F(F(y_0, y_1), y_2), \ldots m\ y_m)$ for a set of values $\{y_0, y_1, y_2, \ldots, y_m\} \in Y$; and 3) it is a quasi-commutative hash function that is different from other well-known hash functions such that the accumulator value A does not depend on the order of $y_i$ accumulations.

These properties allow cryptographic accumulators to be used for a condensed representation of a set of elements. In addition, because the resulting accumulated hashes of $y_i$ ($Y=\{y_i; 0<i<m\}$) stays the same even if the order of hashing is changed, it can be used for efficient membership testing by using a special value called a witness value $w_i$. For instance, the witness $w_j$ of corresponding y is calculated by accumulating all $y_i$ except the case where i≠j (e.g., $w_j=F(F(y_0, y_1), \ldots, y_j-1, y_j+1, \ldots, y_m))$. Then, when necessary any of the members can check whether $y_j$ is also a member of the group by just verifying whether $F(w_j, y_j)=A$. Because F is a one-way function, it would be computationally infeasible to obtain $w_j$ from $y_j$ and A. However, there is a risk for collusion in this scheme when an adversary can come up with $w_j'$ and $y_j'$ pairs where $y_j' \notin Y$ to obtain the same accumulator value: $F(w_j', y_j')=A$. The Rivest-Shamir-Adleman (RSA) construction guarantees that finding such pairs is computationally hard by restricting the inputs to the accumulator function to be prime numbers only (see also Baric et al., "Collision-free accumulators and fail-stop signature schemes without trees," in Advances in Cryptology EUROCRYPT97. Springer, 1997, pp. 480-494; which is hereby incorporated by reference herein in its entirety). This scheme can be referred to as a collision-free accumulator that enables secure membership testing (i.e., without any collision). Therefore, embodiments of the subject invention can employ an RSA construction.

An RSA accumulator has an RSA modulus N=pq, where p and q are strong primes. The RSA accumulation value A is calculated on consecutive modular exponentiation of prime numbers set $Y=\{y_1, \ldots, y_n\}$ as follows:

$$\mathcal{A} = g^{y_1, \cdots y_n} (\text{mod } \mathcal{N}) \quad (2)$$

The witness $w_i$ of corresponding $y_i$ is calculated by accumulating all values except $y_i$:

$$w_i = g^{y_1, \cdots y_{i-1} y_{i+1}, \cdots y_n} (\text{mod } \mathcal{N}) \quad (3)$$

Then, the membership testing can be done via a simple exponential operation by comparing the result with the accumulator value A:

$$w_i^{y_i} \leftrightarrow \mathcal{A} \quad (4)$$

Certificates are issued by a CA with a planned lifetime to an expiration date and have unique serial numbers. Once issued, the certificates are valid until their expiration date. However, there are various reasons that cause a certificate to be revoked before the expiration date. These reasons include but are not limited to the corresponding private key being compromised and/or the underlying device infrastructure being changed.

Revocation causes each CA to regularly issue a signed list called a CRL, which is a time-stamped list having serial numbers of revoked certificates along with revocation dates. When a PKI-enabled system uses a certificate (for example, for verifying the integrity of a message), that system should not only check the time validity of the certificate, but an additional check should be performed to determine a certificate's revocation status during the integrity check. To do so, the CRL can be checked to determine the status of the certificate.

There are two main types of CRL: full CRLs; and delta CRLs. A full CRL contains the status of all revoked certificates that are not expired yet while delta CRLs contain only the status of newly revoked certificates that have been revoked after the issuance of the last full CRL and before the next release of it. Therefore, the most recent version of the CRL or delta CRLs is/are made available to all the potential nodes that will be using it. In the case of AMI, these CRLs need to be accessible by all the smart meters.

Embodiments of the subject invention minimize or eliminate the need to store and distribute CRLs when devices communicate in a secure manner. Instead of keeping a CRL file for verification of revocation status of certificates, embodiments can store at each device (e.g., smart meter, gateway, head end system (HES), etc.) only an accumulator value and a proof that proves the validity of the device's certificate. The accumulator value and proof can be computed at the utility company and distributed to devices in advance. Any updates regarding revoked certificates trigger re-computation of these values. Keeping just two integer values for revocation management brings a lot of efficiency in terms of storage and distribution overhead (see also the Examples below).

One or more modifications can be made to an existing RSA accumulator so that it can be employed in embodiments of the subject invention. These modifications can be as follows.

1) Introducing Non-witness Value Generation: In traditional CRL approaches, when a smart meter presents its certificate to the recipient meter, that meter needs to verify that the presented certificate is not in the CRL. This is contrary to the membership testing approach within an RSA accumulator. In that accumulator, the goal is to check whether an element is in a list and to ensure that a witness value should be presented. Therefore, in embodiments an RSA accumulator can be modified where non-membership should be checked. To be able to employ the accumulator approach, a non-witness value for the presenter can be generated to prove that it is not in the list. Li et al. "Universal accumulators with efficient non-membership proofs," in ACNS. Springer, 2007; which is hereby incorporated by reference herein in its entirety) teaches generation of non-witness values. The revocation information (stored in CRLs) can be accumulated into a single accumulator value and non-membership witnesses can be produced for the non-revoked smart meters. The time complexity of this non-membership witness generation is O(n), which is the same as the witness generation described in Equation 3 where n represents the number of inputs to the accumulator. Therefore, to reduce the computational complexity, the method of Li et al., which relies on extended Euclidean operation to reduce time complexity to O(1), can be used.

2) Reducing the Complexity of Accumulator Computation: While computing the accumulator value using Equation 2, the exponent needs to be computed as $\Pi_{i=1}^{n} y_i$ before doing the modular exponentiation. This becomes infeasible when the size of $\mathbb{Y}$ increases because $\Pi_{i=1}^{n} y_i$ will be n×k bits assuming each $y_i$ is a k-bit integer. In embodiments, Euler's Theorem can be used to cope with this complexity (see also Hart et al., "Flintfast library for number theory," 2011; which is hereby incorporated by reference herein in its entirety). With access to the totient of $\mathcal{N}$ (i.e., $\phi(\mathcal{N})$), the exponent of g in accumulation computation will be $\Pi_{i=1}^{n} y_i$ mod $\phi(\mathcal{N})$. Thus, with the knowledge of the totient, it becomes more efficient to compute the accumulator value via reducing the entire exponent by $\phi(N)$.

3) Generating Prime Inputs for the Accumulator: For accumulation, the certificate IDs that are generated by the CAs can be used. However, to ensure a collision-free accumulator, only prime numbers as dedicated by the RSA accumulator may be used. Because CRLs contain arbitrary serial numbers for certificate IDs, a prime representative for each certificate ID can be computed as an input to the RSA accumulator. The method described in Li et al. (supra) can be used for generation of prime representatives from the serial numbers. The advantage of this method is to generate fixed-size (k-bits) prime representatives regardless of the input size.

4) Functions of the Modified RSA Accumulator: After preparing the inputs, the accumulator structure can be compiled and modified and the following functions can be used to construct revocation management for AMI. The RSA accumulator can use the following input sets: $\mathbb{Y}$ is the set of prime representatives of revoked certificates' serial numbers and $\mathbb{X}$: is the set of prime representative of valid certificates' serial numbers, where $x \in \mathbb{X}$.

aux$_{info}$, N←Setup(k): This function is to set up the parameters of the accumulator. It takes k as an input, which represents the length of the RSA modulus in bits (e.g., 2048, 4096, etc.), and generates modulus N along with aux$_{info}$, which is basically Euler's totient $\phi(N)$. aux$_{info}$ helps to make computation of accumulator and non-membership witnesses faster via Euler's Theorem, which reduces the size of large exponents.

$\mathcal{A}$←ComputeAcc($\mathbb{Y}$, $r_k$, aux$_{info}$): This is the actual function that accumulates revocation information by taking prime representatives of serial numbers set $\mathbb{Y}$. While computing the accumulator value, an initial random secret prime number $r_k$ can be used as a first exponent ($g^{r_k}$). This is for inhibiting or preventing an adversary from making a guess about accumulated serial numbers by utilizing publicly available information about certificate serial numbers.

nr$_{proof}$←ComputerNonRevokedProof(aux$_{info}$, $\mathbb{Y}$, x): This function first computes a pair of non-witness values represented as (nw$_1$, nw$_2$) for a valid certificate whose prime representative is x. Then, the UC concatenates the non-witness value pair with x and the serial number of the certificate creating a 4-tuple called nr$_{proof}$. The UC then signs this tuple. By signing this tuple, the UC ensures that it is produced by the UC itself. This scheme inhibits or prevents the use of any stolen nw$_1$ & nw$_2$ values by an adversary. Moreover, it inhibits or prevents a possible fake non-witness generation attack when an advanced adversary has the prime number generation algorithm and the CRL information.

0, 1←RevocationCheck(A, nr$_{proof}$): When a smart meter that has a prime representative x wants to authenticate itself to another party, the other one uses nr$_{proof}$ and A to verify that x is not in the accumulated revocation list by checking whether $A^{nw_1} = nw_2^x \times g \pmod{N}$ holds. Note that nr$_{proof}$ contains all the required information for this computation as it includes nw$_1$ & nw$_2$ and the prime representative x.

$A^t$ UpdateAcc($A^{t-1}$, $\mathbb{Y}^t$): This function is for updating the accumulator value A when the revocation information is updated via deltaCRLs. It takes a set of prime representatives of corresponding newly revoked certificates $\mathbb{Y}^t$ and latest accumulator value $A^{t-1}$, and returns the new accumulator value $A^t$.

nr$_{proof}^t$←UpdateNonRevokedProof($\mathcal{A}^t$, $\mathbb{Y}^t$, x): This function is for updating the non-revoked proof of corresponding valid smart meters when the revocation information is updated via deltaCRLs. It takes a set of prime representatives of corresponding newly revoked certificates $\mathbb{Y}^t$, the updated accumulator value $A^t$, and the prime representative x and returns non-revoked proof nr$_{proof}^t$ of smart meter after some additional certificates are revoked.

FIG. 1 shows a schematic view of a revocation management system, according to an embodiment of the subject invention. Referring to FIG. 1, the system architecture can enable the revocation management and define its interaction with the deployed AMI components. Components of the architecture/system can include the following.

Smart Meters and Gateway: The smart meters and gateway can directly communicate with each other and with a head-end system (HES) over LTE. To ensure the security of applications, these devices can run the RevocationCheck( ) function and carry the latest A and the corresponding $nr_{proof}$.

Head-End System: The HES is an interface between the utility operations center and smart meters, and it is located in a demilitarized zone (DMZ). The primary function of the HES is to collect the power data from smart meters and transfer them to head-end management servers (HMS). Because it has two-way communication with smart meters, it can run the RevocationCheck( ) function and carry the latest A and its $nr_{proof}$.

CRL Collector: The CRL collector plays one of the key roles in the revocation management system. It collects CRLs from various CAs and feeds them to the Accumulator Manager. Because it has an open interface to the outside network (communicating with other CAs), it can be placed in DMZ area.

Accumulator Manager: The accumulator manager is the core of the revocation management scheme. It obtains CRL information from the CRL collector and accumulates them to obtain the latest accumulator value. It implements the Setup( ) ComputeAcc( ), ComputeNonRevokedProof( ), UpdateAcc( ), and UpdateNonRevokedProof( ) functions. Whenever a new accumulator value is calculated at a time t, the accumulator manager sends the accumulator value $A^t$ and updated $nr_{proof}^t$ to the HMS, which then forwards them to the HES for distributing to the smart meters. The security of the accumulator manager is critical because it holds both the accumulator and RSA settings (i.e., $aux_{info}$ and p&q). Therefore, it should not have any outgoing traffic. In case the security of these parameters cannot be ensured, they can be either deleted (once they are used initially) or outsourced to third parties. In such cases, the computation of the accumulator and $nr_{proof}$ can still be accomplished without using those parameters but it may be more computationally intensive (see also the Examples section).

Head-End Management Server: The collected data can be managed within the HMS. It can monitors activity logs, identify new devices, and manage incident response processes. As mentioned, the HMS can collect the newly generated A and $nr_{proof}$ values and send them to the HES for distribution.

The revocation and certificate verification process can include accumulating the CRL and certificate verification protocol. These two will be described in further detail.

Accumulating the CRL: This process includes two phases, namely the setup phase and the update phase as described below.

The setup phase: In this phase, the accumulator manager in the UC can accumulate the revoked certificate IDs in full CRLs. The full CRL files are read, and each certificate ID and its issuer's public key are concatenated to obtain a unique string that will be input to the accumulator. The issuer's public key is concatenated on purpose to eliminate any duplicates in serial numbers that may come from different CAs. Then, the accumulator manager can calculate prime representatives for each concatenated string and can accumulate these prime representatives to obtain the accumulator value. Finally, the accumulator manager can generate non-revoked proofs (i.e., the 4-tuple $nr_{proof}$) for each end-device (e.g., smart meter, gateway, HES) by using the ComputeNonRevokedProof( ) function.

The update phase: This phase is for revocation information updates that can be done through delta CRLs. Due to such updates, the accumulator value A and $nr_{proof}$ values should be updated. To update these values, the accumulator manager first prepares the prime representatives for the newly revoked certificates (i.e., the ones that are included in the delta CRLs) by following the same approach in the setup phase. It then updates the previously computed accumulator value, $A^{t-1}$, by using the UpdateAcc( ) function to obtain $A^t$, which is then used to generate new $nr_{proof}$ tuples for the end devices by using the UpdateNonRevokedProof( ) function.

Figure 2:
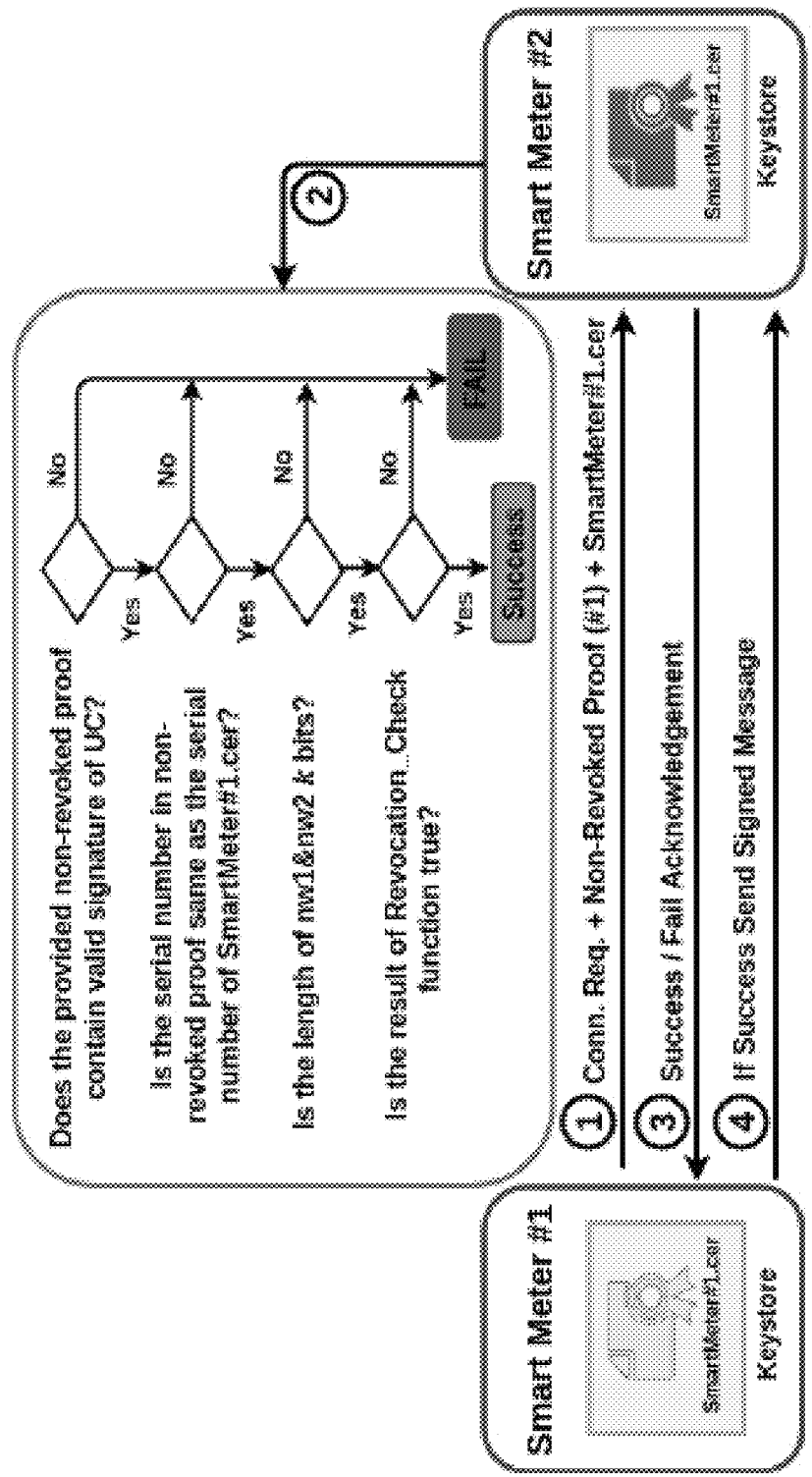
FIG. 2 shows a schematic view of a certification verification protocol scheme, according to an embodiment of the subject invention.

Certificate Verification Protocol: When two meters communicate by sending/receiving signed messages, the signatures in these messages should be verified. To be able to start the verification process, a receiving device can use the public key (for signature verification) presented in the certificate sent to itself. To ensure that this certificate is not revoked, it can then initiate a process that can be referred to as certificate verification protocol. FIG. 2 shows an overview of this process. Referring to FIG. 2, the receiving device can check the corresponding $nr_{proof}$ tuple's signature to ensure that it is produced by the UC. Once the signature is verified, it then checks whether the serial number within the tuple is the same as the serial number of the provided certificate (i.e., either EndDevice #1.cer). For additional security, it also checks the length of the $nw_1$&$nw_2$ to see whether it is equal to the first accumulation setup parameter k. Finally, by performing the RevocationCheck( ) function, it checks whether the provided $nr_{proof}$ is correct. If all these steps are successful, the end-device has successfully completed the certificate verification protocol.

Embodiments of the subject invention can utilize a one-way cryptographic accumulator-based approach for maintaining and distributing revocation information. The framework condenses the CRLs into a short accumulator value and builds a secure, efficient, and lightweight revocation mechanism in terms of communication overhead. The approach utilizes cryptographic accumulators and is based on the requirements of AMI. The experimental results indicate that the accumulator-based approach can reduce the distribution completion time significantly compared to CRL and Bloom filter approaches while introducing only minor additional computational overhead, which is handled by the UC. There is no overhead imposed on smart meters.

Embodiments of the subject invention have applications in at least the following areas: security; access control; authentication; and efficient revoked certificate management. Embodiments can allow the easy and non-intrusive identification of the AMI devices for security purposes. Access control is a security measure in which the access to resources is restricted to a selective set of users, devices, or systems. Embodiments can support existing access control mechanisms utilizing the identified public key infrastructure. In this way, device certificates can complement access control decisions. Authentication is a security procedure in which the identity of users or systems is confirmed. Embodiments provide complementary security measures to authentication; a certified device would ensure the confidence of the authentication process. Efficient revoked certificate management is required for revoking certificates in case of key and certificate compromise, or in order to exclude malicious meters. There have been several real-world incidents that required revoking a huge quantity of certificates immediately, so performing revoked certificate management efficiently is critical.

The methods and processes described herein can be embodied as code and/or data. The software code and data described herein can be stored on one or more machine-readable media (e.g., computer-readable media), which may include any device or medium that can store code and/or data for use by a computer system. When a computer system and/or processor reads and executes the code and/or data stored on a computer-readable medium, the computer system and/or processor performs the methods and processes embodied as data structures and code stored within the computer-readable storage medium.

It should be appreciated by those skilled in the art that computer-readable media include removable and non-removable structures/devices that can be used for storage of information, such as computer-readable instructions, data structures, program modules, and other data used by a computing system/environment. A computer-readable medium includes, but is not limited to, volatile memory such as random access memories (RAM, DRAM, SRAM); and non-volatile memory such as flash memory, various read-only-memories (ROM, PROM, EPROM, EEPROM), magnetic and ferromagnetic/ferroelectric memories (MRAM, FeRAM), and magnetic and optical storage devices (hard drives, magnetic tape, CDs, DVDs); network devices; or other media now known or later developed that are capable of storing computer-readable information/data. Computer-readable media should not be construed or interpreted to include any propagating signals. A computer-readable medium of the subject invention can be, for example, a compact disc (CD), digital video disc (DVD), flash memory device, volatile memory, or a hard disk drive (HDD), such as an external HDD or the HDD of a computing device, though embodiments are not limited thereto. A computing device can be, for example, a laptop computer, desktop computer, server, cell phone, or tablet, though embodiments are not limited thereto.

A greater understanding of the embodiments of the subject invention and of their many advantages may be had from the following examples, given by way of illustration. The following examples are illustrative of some of the methods, applications, embodiments, and variants of the present invention. They are, of course, not to be considered as limiting the invention. Numerous changes and modifications can be made with respect to the invention.

Materials and Methods

Embodiments of the subject invention were implemented in C++ by using FLINT (see also Hart et al., "Flintfast library for number theory," 2011; which is hereby incorporated by reference herein in its entirety), which is the fastest library for number theory and modular arithmetic operations over large integers. Crypto++ library was used for the RSA modulus generation and computation of the prime representatives because it allows thread-safe operations. A binary-encoded full CRL and delta CRL that have been digitally signed according to RFC 5280 standard were prepared and contained 30,000 and 1000 revoked certificates for full CRL and delta CRL, respectively. The full CRL was used to compute A and $nr_{proof}$ tuples during the setup phase while the delta CRL was used for updating both A and $nr_{proof}$ tuples.

The well-known ns-3 simulator, which has a built-in implementation of IEEE 802.11s mesh network standard, was used for communication overhead assessment (see also ns 3, "ns-3: network simulator 3," Release 3.24.1, 2016. [Online] Available: http://www.nsnam.org/; which is hereby incorporated by reference herein in its entirety). The underlying MAC protocol used was 802.11g. Two different AMI grid topologies were created and included 81 and 196 smart meters, respectively.

Figure 3A:
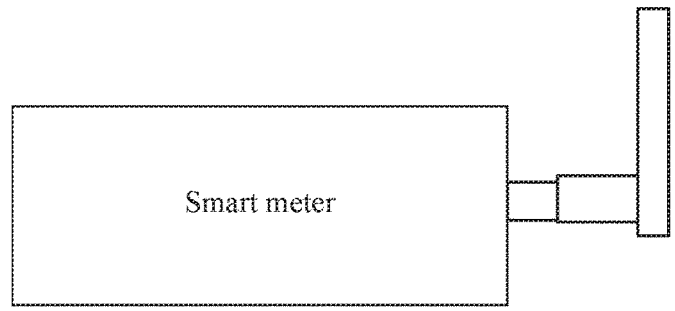
FIG. 3(a) shows a smart meter of an advanced metering infrastructure (AMI) testbed.
Figure 3B:
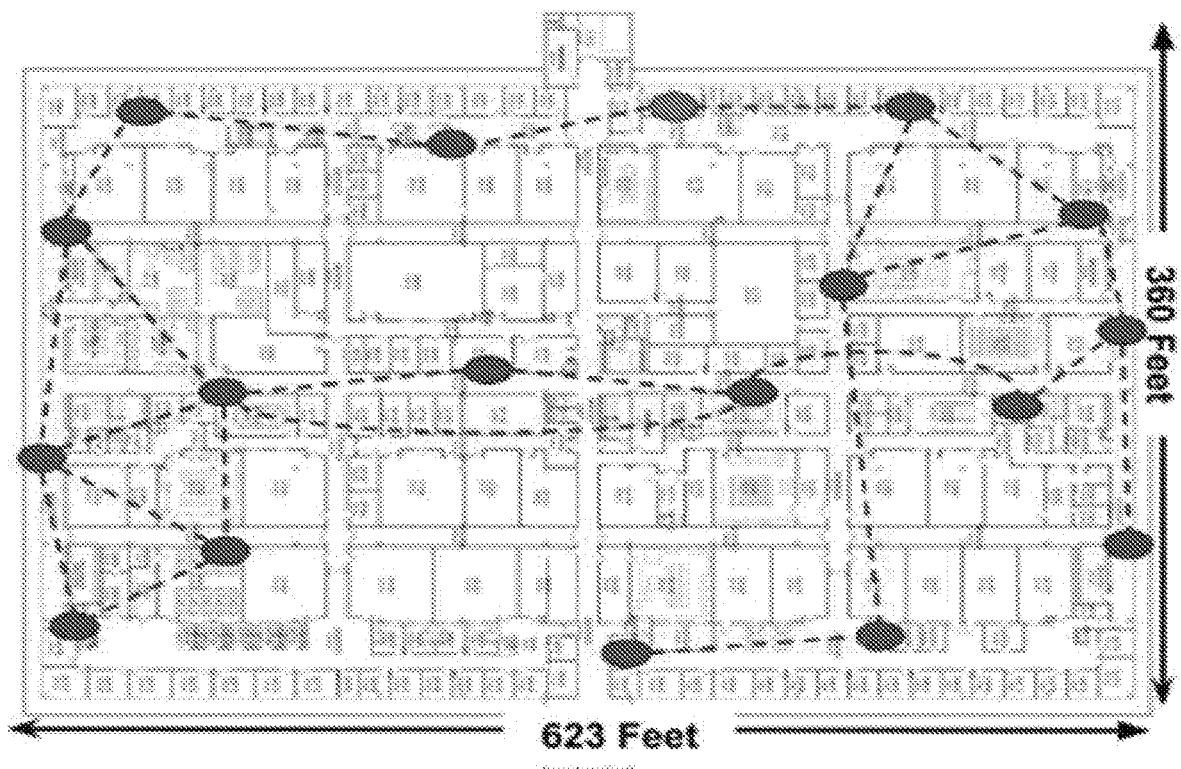
FIG. 3(b) shows a topology of the AMI testbed.

In addition, for more practical results/measurements, an IEEE 802.11s-based mesh network was built and comprised 18 Protronix Wi-Fi dongles attached to Raspberry-Pis, which were integrated with in-house meters of the type shown in FIG. 3(a). While building the testbed on the third floor in the Engineering Center of FIU, the meters were carefully dispersed on the floor as shown in FIG. 3(b). To enable multi-hop communications among meters, the Tx-Power was decreased by a factor of 16 to limit their transmission range. Such positioning and decreased Tx-Power was done to mimic realistic conditions that reflect the path attenuation, refraction, and diffraction of the signal.

The communication and computation overhead of was investigated using the following metrics:

Completion Time: This metric is defined for communication overhead assessment, which indicates the total elapsed time to complete the distribution of accumulator value and non-revoked proofs to the smart meters from the HES. This metric hints on the communication overhead of revocation management in terms of assessing how it keeps the communication channels busy, which is critical for carrying other information.

Computation Time: This is the metric to measure the total time for completing the required computations, including but not necessarily limited to computation of accumulator value, prime representatives, and revocation check time.

Storage: This metric indicates the amount of space for storing the CRL information in the meters.

As comparison to the tested embodiments, two other baselines from the related art were used:

Traditional CRL Method: Each smart meter keeps the whole CRL locally, which is distributed by the UC (see also Mahmoud et al., "Efficient public-key certificate revocation schemes for smart grid," in Global Communications Conference (GLOBECOM), 2013 IEEE. IEEE, 2013, pp. 778-783; which is hereby incorporated by reference herein in its entirety).

Bloom Filter Method: A Bloom filter is used to store revoked certificates information (see also Akkaya et al., "Efficient generation and distribution of crls for ieee 802.11 s-based smart grid ami networks," in Smart Grid Communications. IEEE, 2014; which is hereby incorporated by reference herein in its entirety). The murmur hash function, which is a non-cryptographic hash function suitable for fast hash-based lookup, was employed to build this Bloom filter. In this case, the Bloom Filter is distributed to each meter by the UC.

Example 1—Communication Overhead

A main objective of embodiments of the subject invention is to improve the efficiency of the distribution of CRLs.

Figure 4:
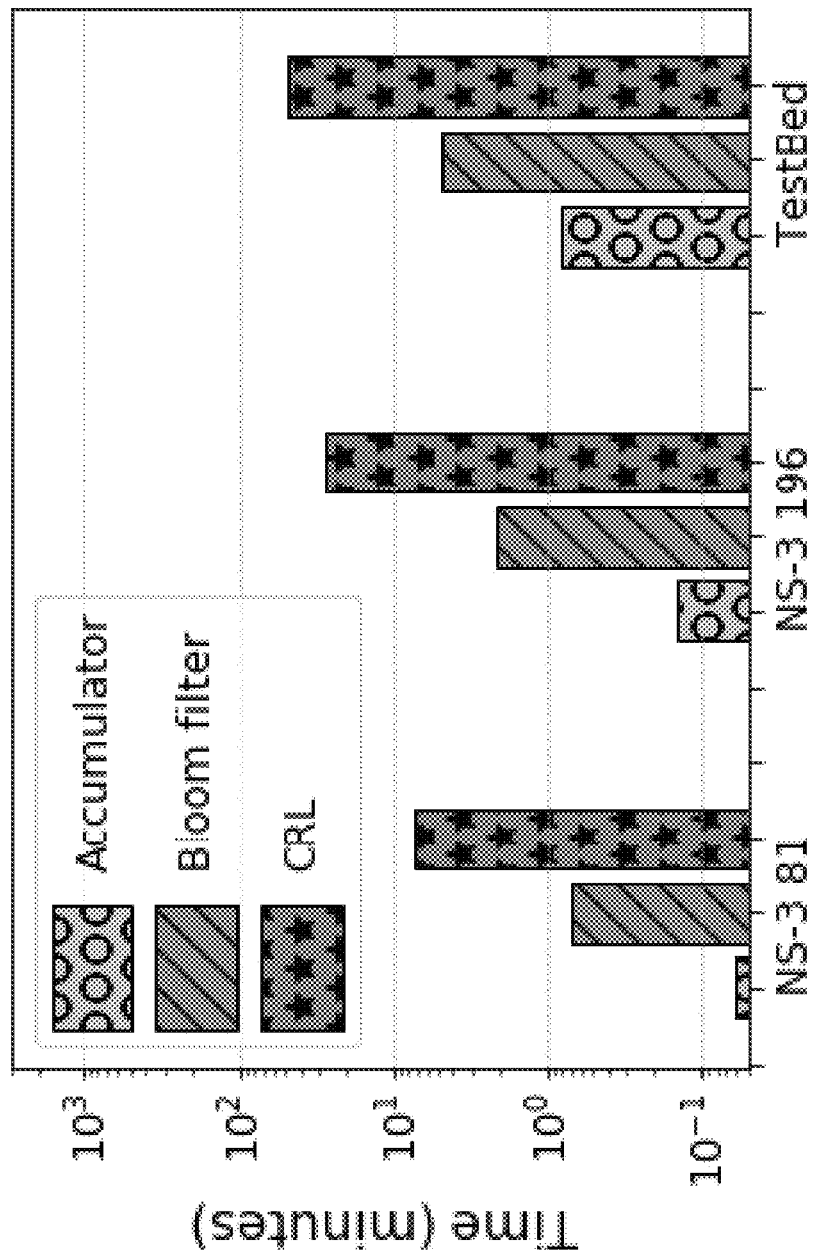
FIG. 4 shows a bar chart of time (in minutes), showing certificate revocation list (CRL) distribution overhead.

The CRL distribution overhead was tested in the form of the completion time for the CRL distribution of the tested embodiment compared to the two other baselines both in simulation and testbed environments. The results are shown in FIG. 4 and indicate that the accumulator approach of embodiments of the subject invention (hereinafter referred to as "the accumulator approach") significantly reduces the completion time compared to local CRL and Bloom filter approaches due to condense accumulating. Even compared to Bloom filter, which is touted as one of the most efficient related art methods, the accumulator approach reduced the completion time by approximately more than 10 orders of magnitude.

Another critical observation from the simulation results is the scalability capabilities of the accumulator approach of embodiments of the subject invention. While especially for the local CRL approach, the completion time increases significantly, this is not the case for the accumulator approach. This can be attributed to the fact that the accumulator value is independent of the revoked CRL size while the overhead of other methods is proportional to the CRL size. The main overhead of the accumulator approach is directly related to the accumulator setting, which was 2048 bits in this example. Therefore, even for very large-scale deployments that can have millions of meters, the overhead will not be impacted.

In analyzing the experimental results for the testbed, the completion time is larger even though the network size is much smaller. This is mainly because of the signal propagation issues including but not limited to path attenuation, refraction, and interference from other devices within the building, which does not exist in ns-3 simulations. Such issues cause more errors and packet loss and thus increase the re-transmissions to complete all packet distributions. In fact, the AMI infrastructure might have a similar challenge depending on the geographical location (e.g., urban versus rural environments) and thus the distribution of CRL will become even more critical. Therefore, the accumulator approach will be more suitable for such environments to reduce the impact from the surrounding environment.

Figure 5:
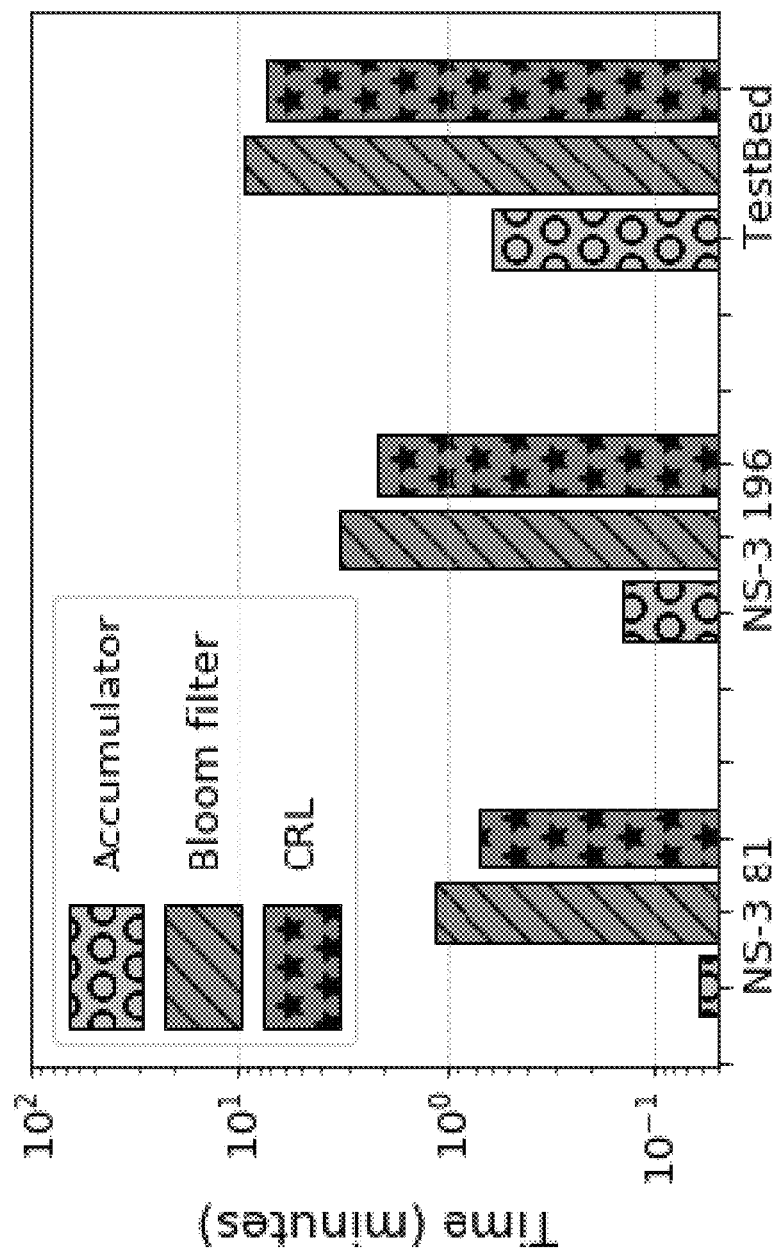
FIG. 5 shows a bar chart of time (in minutes), showing CRL update overhead.

The CRL update overhead was assessed assuming that such updates are done regularly using the delta CRL concept. FIG. 5 shows revocation update overhead in terms of the completion time. As with full CRL, the accumulator approach significantly outperformed the others due to of the size of the delta CRL. The results for the Bloom filter approach showed a different trend by performing worse than the local CRL approach. This can be explained as follows: for each updated revocation information, the Bloom filters must be created from scratch to carry both previous and newly revoked certificates. As a result, updating the CRL will take slightly more time than the whole CRL distribution for Bloom filter and thus will take more time than the local CRL approach. Note that the overhead of CRL distribution is proportional to the size of the delta CRL and thus the completion time follows a similar trend in FIG. 5 as it does in FIG. 4. The testbed results in FIG. 5 display are consistent with the simulations; though the completion time is again higher (as with FIG. 4) due to signal propagation and interference issues.

In FIGS. 4 and 5, the embodiments of the subject invention are labeled "Accumulator" while the traditional CRL method and the Bloom filter method are labeled "CRL" and "Bloom filter", respectively.

Example 2—Computation Overhead

Example 1 demonstrated that the accumulation approach significantly reduces the communication overhead. This example assesses whether such a reduction introduces any major computational overhead. Thus, a detailed computational overhead was investigated. Specifically, two types of experiments were conducted. First, the overhead of the computations due to the accumulation process in the accumulator manager was assessed. These experiments were conducted on a computer that had a 64-bit 2.2 GHz CPU with 10 hardware cores, and 32 GB of RAM assuming that these are reasonable specifications for the computer that will act as the accumulator manager. It was also investigated whether some of these computations can be parallelized to further reduce the computation times through multi-thread implementations. The computation time for the Revocation-Check( ) function in meters was also investigated by implementing it in a Raspberry Pi (smart meter).

The overhead results for the accumulator manager were evaluated by considering the computing of prime representatives, the computing of the accumulator value, and the computing of non-revoked values.

Figure 6:
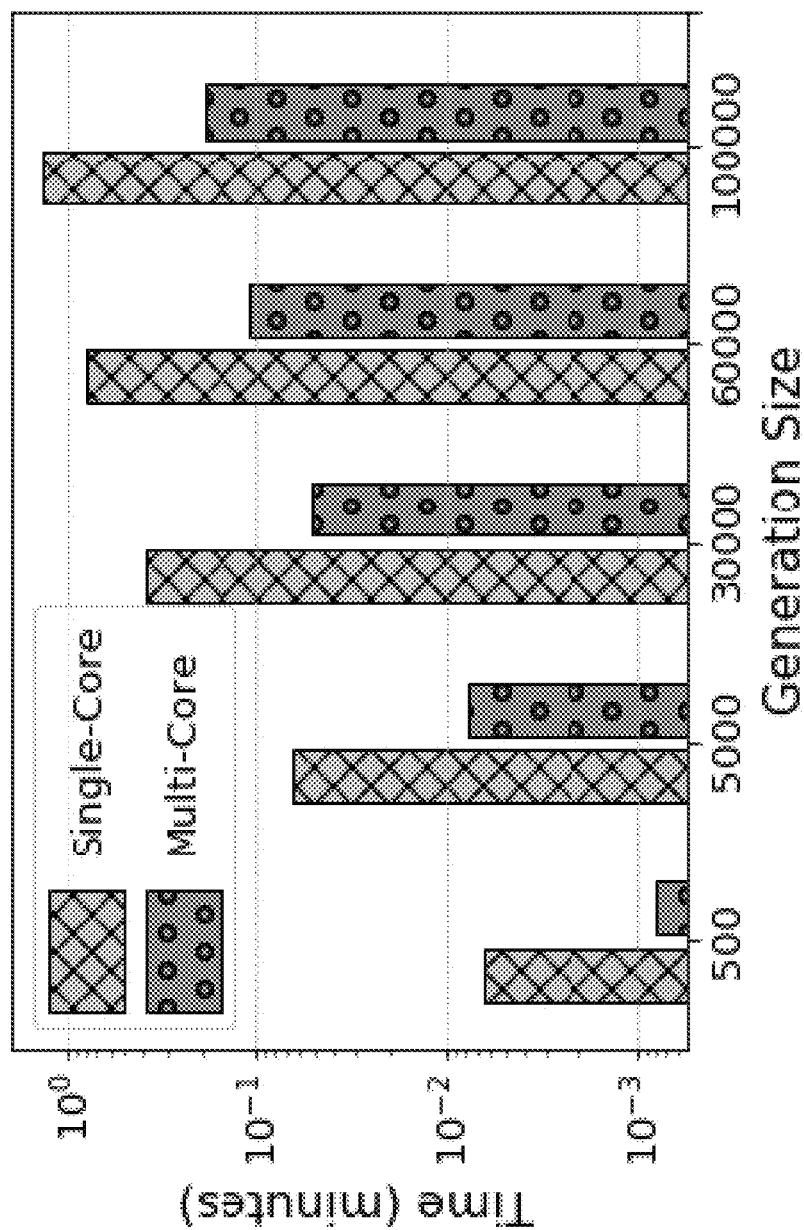
FIG. 6 shows a bar chart of time (in minutes), showing prime representative computation.

To assess the computational overhead of prime representative generation, prime representatives for different set sizes were computed. Because both the valid and revoked certificates' serial numbers are used in the accumulation approach, the input size can become huge when AMI scales. Therefore, a benchmark test was also conducted by using threads to show the parallelization ability of the accumulation approach. Referring to FIG. 6, the computational complexity of the prime representative generation is not overwhelming. Nearly 105 representatives can be computed in one minute even using a single core. Parallelization reduces the computational complexity by roughly 10 fold, which allows computational times on the order of seconds.

Next, the computation cost of accumulator value was benchmarked according to different CRL sizes as used in the previous experiment. In addition, tests were also conducted to assess the computational difference between a first setting (i.e., the accumulator manager has all $aux_{info}$ information) and a second setting where the accumulator manager does not have $aux_{info}$ as discussed above.

Figure 7:
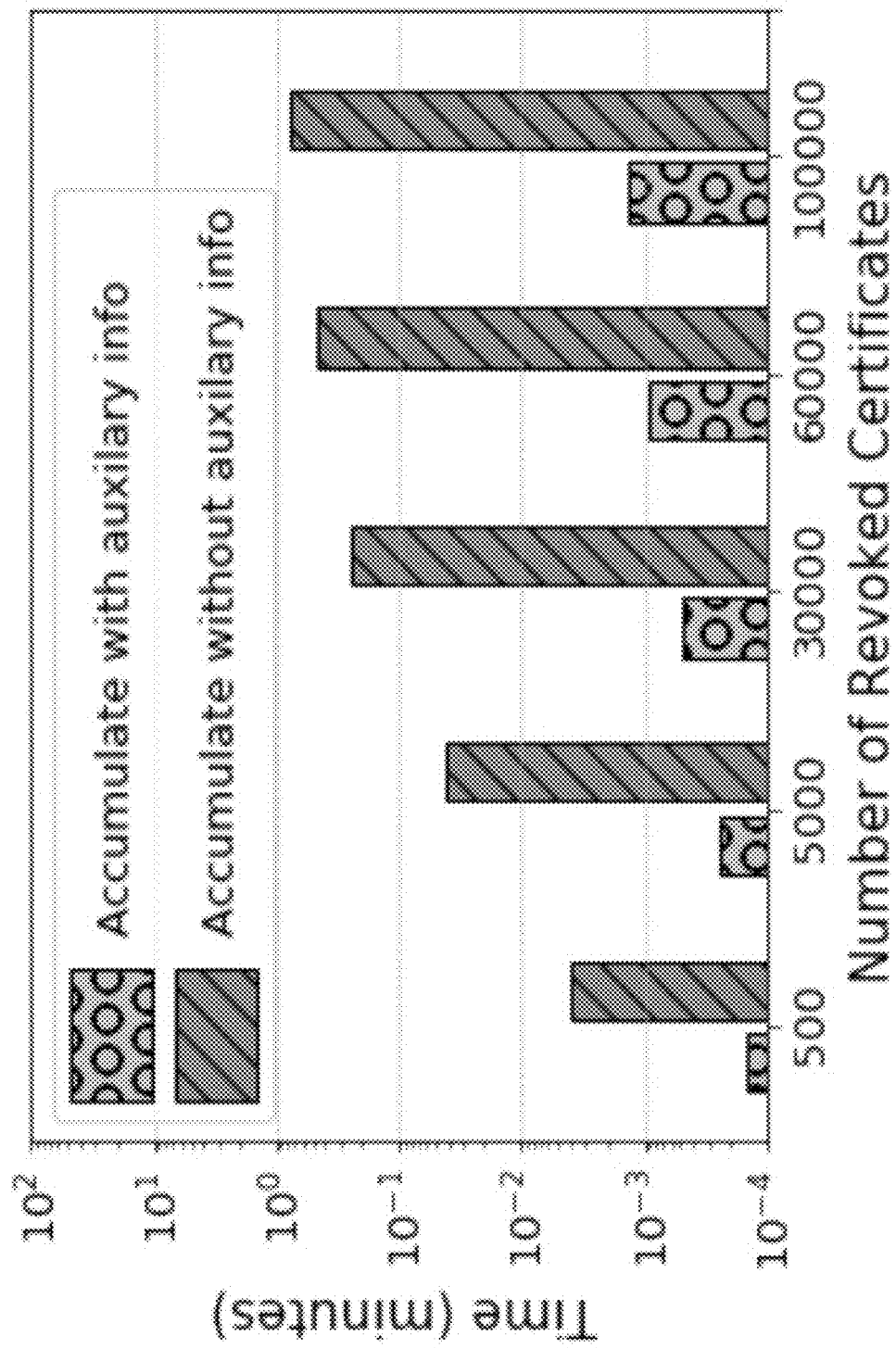
FIG. 7 shows a bar chart of time (in minutes), showing accumulator computation.

For the computation of the accumulator value, a parallel implementation was not possible because each step in the computation depends on the previous operation. Referring to FIG. 7, the accumulator value was calculated in under a minute for 105 revoked certificates even without using $aux_{info}$. However, the availability of $aux_{info}$ significantly reduces the computation time making it possible to finish in milliseconds regardless of the size of the CRL.

Figure 8:
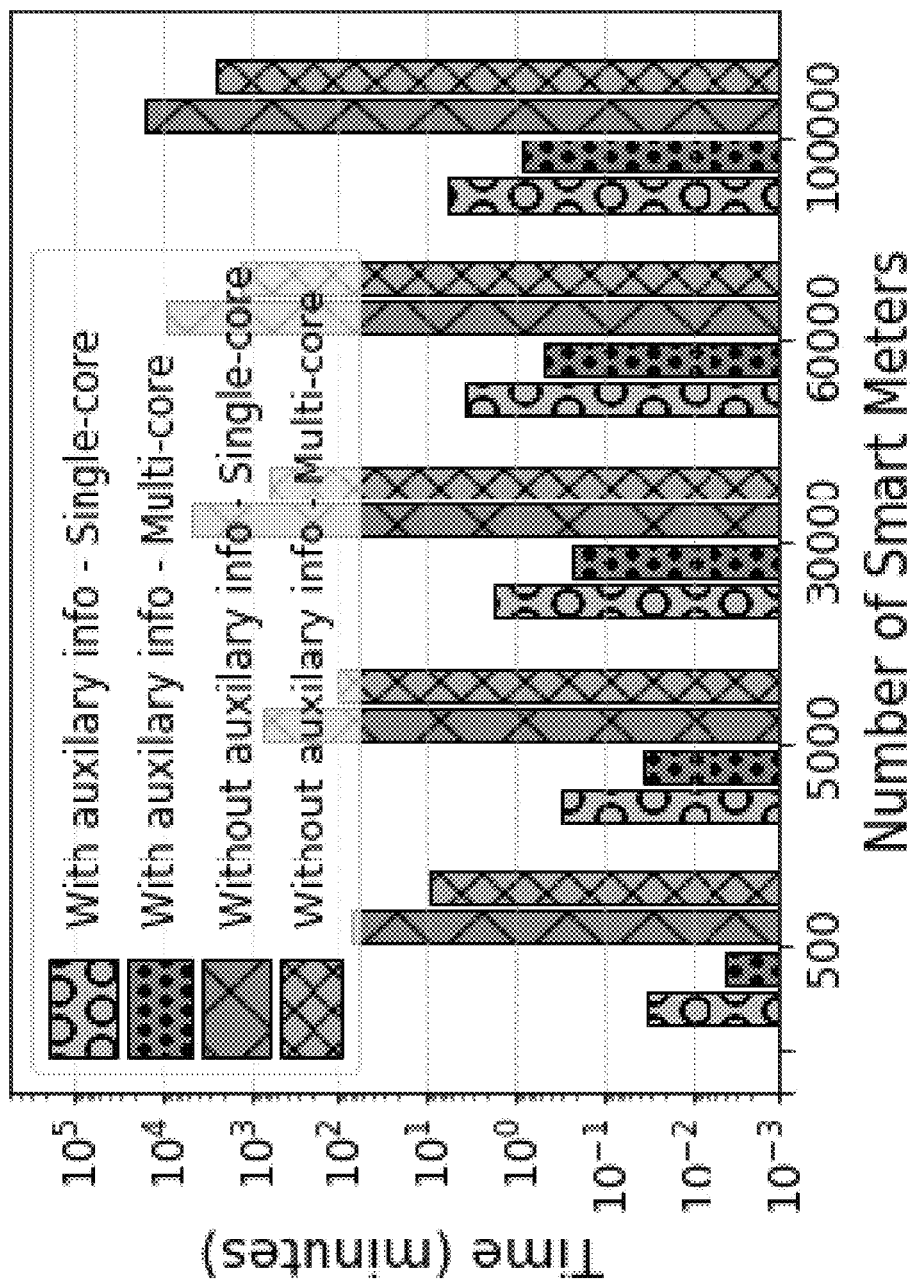
FIG. 8 shows a bar chart of time (in minutes), showing $nr_{proof}$ computation for full CRL.

The overhead of the computation of non-revoked proofs was assessed for both the first setup phase by using full CRL and the update phase by using delta CRL. Again, tests were conducted based on the availability/lack of $aux_{info}$ and parallelization ability. FIG. 8 shows the computation overhead of this function according to different AMI sizes. Referring to FIG. 8, $aux_{info}$ makes a significant difference in this case. Even with parallelization, the computational times are still on the order of days, which may not be acceptable in an AMI setting. The results indicate that $aux_{info}$ needs to be available for efficient computations.

The same experiment was repeated for the UpdateNonRevokedProof( ) function and the same trends were observed because the only change was the size of the CRL (i.e., delta CRL is much smaller).

The computational time overhead for checking whether a certificate is revoked or not was compared for the three approaches. Referring to Table I, the elapsed time for a single revocation check was around 10 milliseconds in the accumulation approach. Compared to the other methods, the Bloom Filter had the best results as expected because it enables faster checking by efficient hash operations. However, Bloom filter suffers from false-positives, which degrades its efficiency by requiring access to the server. The accumulation approach does not have such a problem. The accumulation approach had comparable results with the local CRL method, which requires a simple text search over the complete full CRL file.

TABLE I

ELAPSED REVOCATION CHECK TIME

|  | Local CRL | Bloom Filter | Accumulator Approach |
|---|---|---|---|
| Average Time (ms) | 4.1 | 0.06 | 9.8 |

Example 3—Storage Overhead

In order to compare storage requirements, the needed revocation information size for the accumulation approach was identified and compared with the other approaches, as shown in Table II. As expected, the accumulator approach is superior because smart meters only need to store a small accumulator value and non-revoked proof value in the accumulator approach. Local CRL, on the other hand, keeps the whole CRL list and depending on the number of revoked certificates, it can be huge. The CRL size was around 0.7 MB for 30K revoked certificates. While the Bloom filter performance was decent, it is still not better on par with the accumulation approach, and it suffers from false positives as discussed.

TABLE II

CRL STORAGE OVERHEAD

|  | Local CRL | Bloom Filter | Accumulator Approach |
|---|---|---|---|
| Required Space (MB) | 0.690 | 0.046 | 0.001 |

It should be understood that the examples and embodiments described herein are for illustrative purposes only and that various modifications or changes in light thereof will be suggested to persons skilled in the art and are to be included within the spirit and purview of this application.

All patents, patent applications, provisional applications, and publications referred to or cited herein (including those in the "References" section) are incorporated by reference in their entirety, including all figures and tables, to the extent they are not inconsistent with the explicit teachings of this specification.

What is claimed is:

1. A system for revocation management for an advanced metering infrastructure (AMI) network, the system comprising:
   a plurality of smart meters;
   a head-end system (HES) collecting power data from the plurality of smart meters;
   a gateway in communication with the plurality of smart meters and the head-end system;
   a certificate revocation list (CRL) collector collecting CRLs from certificate authorities (CAs);
   an accumulation manager in communication with the CRL collector and receiving CRL information from the CRL collector, the CRL information being based on the collected CRLs; and
   a head-end management server (HMS) in communication with the accumulation manager and the HES,
   the accumulation manager further accumulating the CRL information and determine an accumulator value (A) and a proof value ($nr_{proof}$) based on the accumulated CRL information using a plurality of functions,
   the HMS receiving the accumulator value and the proof value from the accumulation manager and send the accumulator value and the proof value to the HES for distribution to the plurality of smart meters,
   the accumulator value and the proof value being used by the plurality of smart meters to verify that communication should be accepted,
   the determining of A and $nr_{proof}$ comprising using a prime representative for each certificate serial number in the CRL information as inputs for the plurality of functions,
   the determining of A comprising using the following equation $$A = g^{y_1 \cdots y_n} (\mathrm{mod}\ N),$$

where N=pq, where p and q are strong primes, where Y={$y_1, \ldots, y_n$} is a set of the prime representatives, and where q is an exponentiation function, and
   the determining of $nr_{proof}$ comprising using an initial proof value created by a utility company and updating the initial proof value based on a set of revoked certificates and a value of A.

2. The system according to claim 1, the accumulation manager being a Rivest-Shamir-Adleman (RSA) accumulator.

3. The system according to claim 1, the CRLs collected from the CAs comprising serial numbers of revoked certificates and corresponding revocation dates of the revoked certificates.

4. The system according to claim 1, the accumulation manager sending signals only to the HMS and not to any other device.

5. The system according to claim 1, the HES communicating with the plurality of smart meters via the gateway by first communicating with the gateway over a wireless network.

6. The system according to claim 5, the wireless network being a long term evolution (LTE) network.

7. The system according to claim 1, the CRL collector sending signals only to the accumulation manager and not to any other device.

8. The system according to claim 1, the CRLs comprising at least one of full CRLs and delta CRLs that include only changes from a previous CRL.

9. The system according to claim 1, the plurality of functions comprising a Setup( ) function, a ComputeAcc( ) function, a ComputeNonRevokedProof( ) function, an UpdateAcc( ) function, and an UpdateNonRevokedProof( ) function.

10. A method for revocation management for an advanced metering infrastructure (AMI) network, the method comprising:
    collecting, by a certificate revocation list (CRL) collector, CRLs from certificate authorities (CAs);
    sending, by the CRL collector, CRL information to an accumulation manager, the CRL information being based on the collected CRLs;
    accumulating, by the accumulation manager the CRL information;
    determining, by the accumulation manager, an accumulator value (A) and a proof value ($nr_{proof}$) based on the accumulated CRL information using a plurality of functions;

sending, by the accumulation manager, the accumulator value and the proof value to a head-end management server (HMS);

sending, by the HMS, the accumulator value and the proof value to a head-end system (HES);

distributing, by the HES, the accumulator value and the proof value to a plurality of smart meters; and using, by the plurality of smart meters, the accumulator value and the proof value to verify that communication should be accepted, the CRLs collected from the CAs comprising serial numbers of revoked certificates, the determining of A and $nr_{proof}$ comprising using a prime representative for each serial number of revoked certificates in the CRL information as inputs for the plurality of functions, the determining of A comprising using the following equation $$\mathcal{A} = g^{y_1 \cdots y_n} (\bmod \mathcal{N}),$$

where N=pq, where p and q are strong primes, where Y={$y_1, \ldots, y_n$} is a set of the prime representatives, and where g is an exponentiation function, and the determining of $nr_{proof}$ comprising using an initial proof value created by a utility company and updating the initial proof value based on a set of revoked certificates and a value of A.

11. The method according to claim 10, the accumulation manager being a Rivest-Shamir-Adleman (RSA) accumulator.

12. The method according to claim 10, the accumulation manager sending signals only to the HMS and not to any other device.

13. The method according to claim 10, the CRL collector sending signals only to the accumulation manager and not to any other device.

14. The method according to claim 10, the plurality of functions comprising a Setup( ) function, a ComputeAcc( ) function, a ComputeNonRevokedProof( ) function, an UpdateAcc( ) function, and an UpdateNonRevokedProof( ) function.

15. The method according to claim 10, the CRLs comprising at least one of full CRLs and delta CRLs that include only changes from a previous CRL.

16. A system for revocation management for an advanced metering infrastructure (AMI) network, the system comprising:

a plurality of smart meters;

a head-end system (HES) collecting power data from the plurality of smart meters;

a gateway in communication with the plurality of smart meters and the head-end system;

a certificate revocation list (CRL) collector collecting CRLs from certificate authorities (CAs);

an accumulation manager in communication with the CRL collector and receiving CRL information from the CRL collector, the CRL information being based on the collected CRLs; and a head-end management server (HMS) in communication with the accumulation manager and the HES, the accumulation manager further accumulating the CRL information and determine an accumulator value (A) and a proof value ($nr_{proof}$) based on the accumulated CRL information using a plurality of functions, the HMS receiving the accumulator value and the proof value from the accumulation manager and send the accumulator value and the proof value to the HES for distribution to the plurality of smart meters, the accumulator value and the proof value being used by the plurality of smart meters to verify that communication should be accepted, the accumulation manager being a Rivest-Shamir-Adleman (RSA) accumulator, the CRLs collected from the CAs comprising serial numbers of revoked certificates and corresponding revocation dates of the revoked certificates, the accumulation manager sending signals only to the HMS and not to any other device, the HES communicating with the plurality of smart meters via the gateway by first communicating with the gateway over a wireless network, the wireless network being a long term evolution (LTE) network, the CRL collector sending signals only to the accumulation manager and not to any other device, the CRLs comprising full CRLs and delta CRLs that include only changes from a previous CRL, the plurality of functions comprising a Setup( ) function, a ComputeAcc( ) function, a ComputeNonRevokedProof( ) function, an UpdateAcc( ) function, and an UpdateNonRevokedProof( ) function, the determining of A and $nr_{proof}$ comprising using a prime representative for each certificate serial number in the CRL information as inputs for the plurality of functions, the determining of A comprising using the following equation $$\mathcal{A} = g^{y_1 \cdots y_n} (\bmod \mathcal{N}),$$

where N=pq, where p and q are strong primes, where Y={$y_1, \ldots, y_n$} is a set of the prime representatives, and where g is an exponentiation function, and the determining of $nr_{proof}$ comprising using an initial proof value created by a utility company and updating the initial proof value based on a set of revoked certificates and a value of A.

* * * * *